(12) United States Patent
Zwynenburg et al.

(10) Patent No.: US 6,946,495 B2
(45) Date of Patent: Sep. 20, 2005

(54) FOAMABLE COMPOSITION USING RECYCLED OR OFFGRADE POLYPROPYLENE

(76) Inventors: James L. Zwynenburg, 3 Pheasant Walk, Queensbury, NY (US) 12804; Gary R. Wilkes, 41 Knollwood Dr., Saratoga Springs, NY (US) 12866

( * ) Notice: Subject to any disclaimer, the term of this patent is extended or adjusted under 35 U.S.C. 154(b) by 104 days.

(21) Appl. No.: 10/766,153

(22) Filed: Jan. 28, 2004

(65) Prior Publication Data

US 2005/0165165 A1 Jul. 28, 2005

(51) Int. Cl.$^7$ ................................................. C08J 9/00
(52) U.S. Cl. ........................ 521/47; 521/134; 521/139; 525/98; 525/191; 525/240
(58) Field of Search ........................ 521/47, 134, 139; 525/98, 191, 240

(56) References Cited

U.S. PATENT DOCUMENTS 5,733,980 A * 3/1998 Cozewith et al. ........... 525/314

\* cited by examiner

*Primary Examiner*—Morton Foelak

(57) ABSTRACT

A polymeric composition to be used in producing foam in which the polymeric composition comprises conventional linear polypropylene, high melt strength polypropylene and a rheology modifier resin. The conventional linear polypropylene is in an amount of from about 1 to 25 weight percent of the polymeric composition. The high melt strength polypropylene is in the amount of from about 51 to 85 weight percent of the polymeric composition. The rheology modifier resin is in the amount of from 5 to about 30 weight percent of the polymeric composition. The conventional linear polypropylene may be offgrade virgin polypropylene or recycled polypropylene from post-industrial or post-consumer sources. The rheology modifier resin is a member of the group of styrene-olefin copolymers.

17 Claims, No Drawings

FOAMABLE COMPOSITION USING RECYCLED OR OFFGRADE POLYPROPYLENE

BACKGROUND OF THE INVENTION

The present invention is directed to a polymeric composition to be used in producing foam. Specifically, the polymeric composition is comprised of a recycled or offgrade conventional linear polypropylene, a high melt strength polypropylene, and a rheology modifier resin.

Low density foam, such as polystyrene foam, which has a density in the range of 10 to 160 kg/m$^3$, is commonly made by combining a physical blowing agent with a molten polymeric mixture under pressure and, after thorough mixing, extruding the combination through an appropriate die into a lower pressure atmosphere.

There are two polymeric foams that are commonly produced. The first foam is made firm polystyrene and the second foam is made from low density polyethylenes (LDPEs). Pure polystyrene foam is fragile and is easily deformed permanently by application of compressive or shear force and thus can not be used in many applications that require structural strength. Polystyrene foam has a maximum service temperature just below the boiling point of water and is readily attacked by many common oils found in foodstuffs, and although commonly used in foodservice packaging, can not be used as packaging for many hot foods.

Polymeric foam composed of LDPE are generally considered to be resilient and non-brittle, which are desirable properties. The LDPE foams, however, have disadvantages such as a maximum service temperature below the boiling point of water and a melting point at just above the boiling point of water, which render it unsuitable for many cushioning applications like transportation vehicle components that would otherwise benefit from its resiliency. LDPE foams also have a low flexural strength and despite their excellent chemical resistance to common food oils, are thus not suitable for making packaging for food containers.

Recently, some propylene polymer foams with density below 160 kg/m$^3$ have been reported which have properties that overcome some of the cited shortcomings of both polystyrene and LDPE foams. Because of the low melt strength of conventional linear polypropylenes, which basically have a linear molecular structure, such low density foams produced from propylene polymer require that the major fraction (51 to 100%) of the polymeric composition be a high melt strength polypropylene (HMS-PP). However, in order to achieve the lowest density foams, most processes require 100% HMS-PP for the polymeric composition Since the manufacturing process for HMS-PP polymer itself is complex and costly, HMS-PP is a specialty polymer. HMS-PP is thus sold at a premium typically 60–100% above virgin conventional polypropylenes, which are commodities. Therefore, the cost of these propylene polymer foams has limited its competitive use in applications such as food packaging; transportation components such as automotive trunk liners; construction materials such as pipe wrap and flooring underlayment; sports and leisure equipment such as bodyboards, life vests, seat cushions, and floatation devices; and protective packaging of delicate and fragile high surface quality goods. Furthermore, the current process requirements for propylene polymer foams severely restrict the incorporation of recycled polypropylene from post-consumer and post-industrial sources. Incorporation of recycled polypropylene into a polypropylene foam structure would, of course, be very desirable as new regulations are introduced to reduce waste and to recover and reuse industrial materials.

Accordingly, a need exists for foams that overcome the above-noted shortcomings associated with existing foams.

BRIEF SUMMARY OF THE INVENTION

It is an object of the present invention to produce a foam that can be recycled and which can use recycled polypropylene as a feedstock.

It is a further object of the present invention to produce a foam that can be processed with conventional foaming machinery.

It is yet a further object of the present invention to produce a foam that is light in weight.

It is yet another object of the present invention to produce a foam that is dimensionally stable.

Lastly, it is an object of the invention to produce a resilient, non-brittle, low cost foam structure with a maximum service temperature sufficiently above the boiling point of water that would allow such uses as food packaging; transportation components such as automotive trunk liners; construction materials such as pipe wrap and flooring underlayment; and sports and leisure equipment such as bodyboards, life vests, seat cushions, and floatation devices and which would also be suitable for protective packaging of delicate and fragile high surface quality goods.

The polymeric composition to be used in producing foam of the present invention comprises from about 1 to 25 weight percent of a conventional linear polypropylene (PP), from about 51 to about 85 weight percent high melt strength polypropylene (HMS-PP), and from about 5 to about 30 of a rheology modifier resin. The conventional linear polypropylene may come from reclaimed post-industrial or post-consumer sources or may be offgrade virgin polypropylene from a resin manufacturer. Effective rheology modifier resins are members of the group of styrene-olefin copolymers.

According to one process for preparing a polymeric foam of the present invention, a conventional linear polypropylene, a high melt strength polypropylene and a rheology modifier resin are melted to form a polymeric composition. The polymeric composition comprises from about 1 to 25 weight percent of conventional linear polypropylene, from about 51 to about 85 weight percent of high melt strength polypropylene and from about 5 to about 30 weight percent of the rheology modifier resin. The conventional linear polypropylene may be recycled post-industrial polypropylene, recycled post-consumer polypropylene, offgrade virgin polypropylene from a resin manufacturer, or blends thereof. An effective concentration of nucleating agent is added to the polymeric composition. An effective amount of a stability control agent is added to the polymeric composition. An effective amount of blowing agent is dissolved or dispersed to form a mixture. The molten mixture is transferred to a reduced pressure zone, cooled to an appropriate temperature, and then permitted to expand in the expansion zone to produce the polymeric foam sheet. The thickness of the foam sheet is generally in the range of 0.5 to 15 mm.

Polymeric foam made from the inventive composition has physical and chemical properties similar to that of foam made from HMS-PP alone, but at a lower cost. The inventive foam structures are resilient. Such foams also have a maximum service temperature sufficiently above the boiling point of water to allow uses as food packaging; transportation components such as automotive trunk liners; construction materials such. as pipe wrap and flooring underlayment; and sports and leisure equipment such as bodyboards, life vests, seat cushions, and floatation devices and are suitable for protective packaging of delicate and fragile high surface quality goods.

DETAILED DESCRIPTION OF THE INVENTION

The polymeric composition to be used in producing foam of the present invention comprises conventional linear polypropylene (PP) from about 1 to about 25 weight percent, high melt strength polypropylene (HMS-PP) from about 51 to about 85 weight percent, and a rheology modifier resin from about 5 to about 30 weight percent. The rheological properties of the inventive polymeric blends are characterized as follows by Dynamic Mechanical Spectroscopy measured in accordance with standard test methods ASTM D4440 or ISO 6721-10 using a frequency of 1.00 radians/sec and 25 mm diameter parallel plates with a 1.00 mm gap: a loss tangent (tan $\delta$) in the range of 0.7 to 1.4 and complex viscosity ($\eta^*$) in the range of $1.6 \times 10^4$ to $6.0 \times 10^4$ poise at 190° C., and a power-law relationship between tan $\delta$ and $\eta^*$ where the exponent is in the range of −0.35 and −0.01 for the temperature range of 190° C. to 230° C. The preferred polymeric composition comprises conventional linear polypropylene from about 10 to about 15 weight percent, HMS-PP from about 55 to about 65 weight percent, and a rheology modifier resin from about 10 to about 20 weight percent. The preferred polymeric blend is similarly characterized by a loss tangent (tan $\delta$) in the range of 0.8 to 1.2 and complex viscosity ($\eta^*$) in the range of $1.6 \times 10^4$ to $4.7 \times 10^4$ poise at 190° C., and a power-law relationship between tan $\delta$ and $\eta^*$ where the exponent is in the range of −0.33 and −0.15 for the temperature range of 190° C. to 230° C.

It is contemplated that more than one conventional linear polypropylene, high melt strength polypropylene and/or rheology modifier resin can comprise the respective conventional linear polypropylene, high melt strength polypropylene and rheology modifier resin weight percents of the polymeric composition. For example, two conventional linear polypropylene (each 10 weight percent) can be blended to comprise 20 weight percent conventional linear polypropylene of the polymeric composition.

Conventional Linear Polypropylene (PP)

The term "conventional linear polypropylene" is used herein to mean polypropylene resin that is typically used in applications such as packaging film, carpet fibers, injection molded parts such as medical devices, cutlery, and toys; and thermoformed sheet products such as food containers and food trays. Conventional linear polypropylenes are generally crystalline materials, meaning that they typically have a small temperature range (3–10° C.) with a sharp transition between the solid and molten phases. The molecular structures of conventional linear polypropylenes have limited branching from the main polymer chains. Conventional linear polypropylenes have low melt strength. Because more than 90% of the world production of polypropylene is conventional linear polypropylene, recycled polypropylene is predominantly conventional linear polypropylene. Further, because polypropylene resin manufacturers often produce a number of different grades of polypropylene on the same manufacturing line for the many different applications, the transitions between grades provides numerous opportunities for product that does not meet a particular specification. Thus, there are numerous resources for off-grade virgin polypropylene. Regularly used synonyms for "offgrade" in the art are "off-spec" and "wide-spec".

The conventional linear polypropylene of the present invention is characterized as follows by Dynamic Mechanical. Spectroscopy measured in accordance with standard test methods ASTM D4440 or ISO 6721-10 using a frequency of 1.00 radians/sec and 25 mm diameter parallel plates with a 1.00 mm gap: a loss tangent (tan $\delta$) in the range of 0.6 to 3.5 and complex viscosity ($\eta^*$) in the range of $1.2 \times 10^4$ to $1.5 \times 10^5$ poise at 190° C. The preferred conventional linear polypropylene is similarly characterized by tan $\delta$ in the range of 0.8 to 1.8 and $\eta^*$ in the range of $3.9 \times 10^4$ to $4.8 \times 10^4$ poise at 190° C.

The term "linear polypropylene", as used herein, is meant to include not only homopolymers of propylene, but also propylene copolymers composed of both at least 50 mole percent (preferably at least 70 mole percent) of a propylene unit and a minor proportion of a monomer copolymerizable with propylene, and blends of at least 50 percent by weight (preferably at least 60 percent by weight) of the propylene homopolymer with another polymer.

The term "recycled polypropylene" is used herein to describe polymeric material identified by a material re-processor that has been extruded after initial processing by the original material manufacturer. The recycled polypropylene may come from post-industrial or post-consumer sources. The recycled polypropylene source may include polymeric material that has been recovered from plastic parts which bear the numeral "5" inside of the conventional triangular-shaped three-bent-arrow recycle symbol now mandated by government agencies for plastic parts in general consumer service. Recycled polypropylene that comprises a portion of the foam made by the present invention, and which is to be utilized for food-service applications must be substantially free of certain materials that would be unsuitable for human consumption such as certain waxes, machine oils, and most heavy metal inorganic and heavy metal organometallic compounds. A source of recycled polypropylene suitable for food-service applications is rejected polypropylene medical devices from a qualified manufacturer, such as syringe cases, intravenous bags, tubing, and tubing fittings. Recycled polypropylene is typically available at a price that is in the range of 10% to 40% of typical high melt strength polypropylene prices.

The recycled polypropylene may be reclaimed post-industrial polypropylene, reclaimed post-consumer polypropylene, or a mixture of reclaimed post-industrial polypropylene and reclaimed post-consumer polypropylene in which the complex viscosity of the combination and the damping factor of the combination are simultaneously within the aforementioned ranges.

The term "virgin resin" is used herein as being polymeric material directly from a material. supplier that has not been extruded after initial processing by the material supplier.

The term "offgrade polypropylene" is used herein to describe virgin polypropylene polymeric material that has been identified by a material manufacturer as not meeting certain grade specifications for specific customer applications. Suitable offgrade polypropylenes for the present invention are characterized by the aforementioned properties measured by Dynamic Mechanical Spectroscopy. Offgrade polypropylene material for this invention will have good physical properties typical of polypropylene at normal ambient temperatures. Offgrade virgin polypropylene is typically available at a price that is in the range of 20% to 50% of typical high melt strength polypropylene prices.

High Melt Strength Polypropylene (HMS-PP)

The term "high melt strength polypropylene" (HMS-PP) of the present invention is characterized as follows by Dynamic Mechanical Spectroscopy measured in accordance with standard test methods ASTM D4440 or ISO 6721-10 using a frequency of 1.00 radians/sec and 25 mm diameter parallel plates with a 1.00 mm gap: a loss tangent (tan δ) in the range of 0.9 to 1.2 and a complex viscosity (η*) in the range of $2.1 \times 10^4$ to $2.5 \times 10^4$ poise at 190° C. and a power-law relationship between tan δ and η* where the exponent is in the range of −0.33 and −0.30 for the temperature range of 190° C. to 230° C.

The term "high melt strength polypropylene", as used herein, is meant to include not only homopolymers of propylene, but also propylene copolymers composed of both at least 50 mole percent (preferably at least 70 mole percent) of a propylene unit and a minor proportion of a monomer copolymerizable with propylene, and blends of at least 50 percent by weight (preferably at least 60 percent by weight) of the propylene homopolymer with another polymer. The HMS-PP resin used in the invention process can be any one of those obtained by polymerizing propylene, or polymerizing propylene with other aliphatic polyolefins, such as, ethylene, 1-butene, 1-pentene, 3-methyl-1-butene, 4-methyl-1-pentene, 4-methyl-1-hexene, 5-methyl-hexene and mixtures thereof, or with various other polymerizable monomers. High melt strength polypropylenes are crystalline materials. The high melt strength polypropylene used in the invention process has a branched molecular structure, providing increased molecular entanglement and sufficient melt strength in the foaming step.

It is contemplated that the term HMS-PP of the present invention may also include physical blends of two different HMS-PPs to comprise the high melt strength polypropylene of the present invention. The physical blends are combined in a dry form after the blend components have previously been polymerized.

Rheology Modifier Resin

The term "rheology modifier resin" as used herein refers to polymeric materials that can change the foaming behavior of certain mixtures of conventional linear polypropylene and HMS-PP to enable the combination to produce a polymeric foam. Typically, conventional linear polypropylene introduced at a concentration even as low as 1% by weight into foam extrusion processes that utilize HMS-PP compositions for foams with density below 160 kg/m$^3$ can prevent the. production of foam sheet. However, when added to the mixture of conventional linear polypropylene and HMS-PP, certain polymeric materials have surprisingly been found to stabilize the foaming behavior in the foam sheet process so that foaming can proceed even with the presence of the conventional linear polypropylene in the mixture.

Only certain polymeric materials have been found to act as rheology modifier resins for mixtures of conventional linear PP and HMS-PP. The inventive rheology modifier materials considered herein are members of the group of styrene-olefin copolymers.

The group of styrene-olefin copolymers includes hydrogenated styrene-isoprene-styrene block copolymer (SEPS), styrene-butadiene random copolymer, hydrogenated styrene-butadiene random copolymer, styrene-isoprene random copolymer, hydrogenated styrene-isoprene random copolymer, styrene-butadiene block copolymer (SBR), hydrogenated styrene-butadiene block copolymer (SEB, SEBC), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), styrene-ethylene copolymer, styrene-propylene copolymer, ethylene-styrene graft copolymer, propylene-styrene graft copolymer, EPM-styrene graft copolymer, EPDM-styrene graft copolymer, and their combinations.

The preferred styrene-olefin copolymers for rheology modifiers for blends with conventional linear polypropylene and high melt strength polypropylene are hydrogenated styrene-isoprene-styrene block copolymer (SEPS), styrene-olefin diblock copolymers and styrene-olefin triblock copolymers, which include, for example, styrene-butadiene block copolymer (SEB, SEBC), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), and their combinations.

The most preferred rheology modifier material for blends with conventional linear polypropylene and high melt strength polypropylene are hydrogenated styrene-isoprene-styrene block copolymer (SEPS). Commercially available SEPS products include Septong® 4030 and Septong® 2007 from Kuraray America, It is contemplated that rheology modifier resins may be obtained by blending two or more rheology modifier resins. For example, two different SEPS resins may be blended together such as a mixture of Septon® 4030 and Septon® 2007. Likewise, two or more rheology modifier resins may be blended.

Dynamic Mechanical Spectroscopy

Rheology is the branch of physics that studies the flow of matter. Simple chemical compounds like air and water, which are either gas or liquid at normal ambient temperatures exhibit flow and are classified as fluids. An important distinguishing property of fluids is known as viscosity, which is a measurement of the resistance to flow. Fluids are thus considered to have "viscous" properties. Other simple chemical compounds like steel at normal ambient temperatures are classified as elastic. The term "elastic" refers to the capability to return to original shape after application of stretching or compressive forces. Important distinguishing measurements of elastic materials are generally reported with the word "modulus", such as storage and or loss modulus. Depending upon the measurement technique, the storage modulus is referred to as E' or G', while the loss modulus is referred to as E" or G". Unlike the simpler chemical compounds, polymeric materials have a complex rheological behavior. Polymeric materials are considered to have "viscoelastic" characteristics, which means that they simultaneously exhibit both viscous and elastic properties. The viscous and elastic properties of polymeric materials change behavior over a broad range of temperatures. The particular viscoelastic behavior of a polymeric material depends upon it molecular structure and thus certain range of rheological values can be used to characterize the behavior of a particular polymeric material.

Standardized terminology and test methods have been developed by organizations respected worldwide, such as ASTM International, or the International Standards Organization (ISO) to quantify the dynamic behavior of various materials. ASTM D4092-01, "Standard Terminology: Plastics: Dynamic Mechanical Properties", by ASTM International provides the broadest compilation of the generally accepted definitions and the descriptions of technical terms associated with measurement of dynamic mechanical properties of polymeric materials. The ASTM International definitions for the terms utilized in describing the materials of this invention is incorporated herein by reference.

ASTM D4440-01, "Standard Test Method for Plastics: Dynamic Mechanical Properties: Melt Rheology", by ASTM International, and ISO 6721 Part 10, "Plastics-Determination of Dynamical Properties, Part 10, Complex Shear Viscosity Using a Parallel Plate Oscillatory Rheometer" by the International Standards Organization detail generally acceptable methods for utilization of dynamic mechanical instrumentation in reporting rheological properties of thermoplastic polymeric materials at various conditions of frequency, strain amplitude, and temperature. These test methods, incorporated herein by reference, have been utilized to characterize the materials of this invention.

Dynamical Mechanical Spectroscopy is the term generally used to describe dynamic mechanical testing of materials over a range of temperatures and/or frequency using: parallel plate geometry. The standardized tests specify testing with two parallel plates with equal diameters but allows variable plate diameters and gaps between those plates in the reported testing configuration. Two important rheological values provided by the standardized dynamic mechanical testing of molten polymers are the loss tangent, identified by the expression tan $\delta$, and the complex viscosity, identified with the symbol $\eta^*$. The viscoelastic characteristic of loss tangent is alternatively called the damping factor. For polypropylene, dynamic mechanical testing of the molten polymer phase normally is conducted within the range of 170° C. to 290° C. As reported herein, Damic Mechanical Spectroscopy property values refers to testing results as measured in accordance with standard test methods ASTM D4440 or ISO 6721-10 in the temperature range of 190° C. to 290° C. and a frequency of 1.00 radians/sec using a 25 mm diameter parallel plates with a gap of 1.00 mm.

Although the loss tangent (tan $\delta$) and the complex viscosity ($\eta^*$) are normally adequate to describe the rheological behavior of polymers for many applications, the ability of a polymeric material to produce a polymeric foam in a conventional foam extrusion process is not sufficiently described by those rheological terms at only one particular temperature. For example, two materials which have equivalent tan $\delta$ and $\eta^*$ at a particular temperature can have antithetical results in a foaming process. Consequently, characterization of a polymeric material that can produce polymeric foam requires at least one additional value.

Testing of various homopolymers of propylene and polymeric blends that are predominantly polypropylene have revealed that one such suitable characterizing value for these materials, which relates the damping factor to the complex viscosity, is the exponent in the approximating power-law relation between the damping factor (tan $\delta$) and the complex viscosity ($\eta^*$). There is no theoretical basis for this relationship. The power-law relation that describes the loss tangent (tan $\delta$) and the complex viscosity ($\eta^*$) is determined from a log-log regression analysis of the data from the two parameters. Alternatively stated, this means the plot of log(tan $\delta$) vs log($\eta^*$) can be approximated by a straight line, the slope ($b_1$) of which is the exponent in the power-law relation. This approximate relationship can be summarized as:

$$\log(\tan(\delta)) \approx b_1 \log(\eta^*) + b_0$$

In this approximating relationship, the significance of intercept ($b_0$) is not yet understood.

Prior art has indicated that specific rheological properties can influence foaming. For example, U.S. Pat. No. 4,522,955 (Fukushirna et al.) teaches that the melt tension of the polypropylene base resin is the primary controlling factor in the production of a closed cell polypropylene foam and U.S. Pat. No. 5,527,573 (Park et al.) suggests a rheological factor called a foamability index is a limiting factor in a process for producing a closed-ell polypropylene foam structure having more than 80 percent of closed cells from a polypropylene resin. However, the prior art does not suggest to those skilled in the art that certain combinations of materials, such as conventional linear polypropylene from different sources, which have heretofore demonstrated the ability to interrupt the foaming process for producing foams below 160 kg/m³ when added even in concentrations as low as 1%, may be combined with high melt strength polypropylene to produce a foam when another certain polymeric species are present in the polymeric mixture.

Dynamic Mechanical Spectroscopy of certain conventional linear polypropylenes, certain high melt strength polypropylenes, the indicated rheology modifier resins, various combinations of the two-component blends of the three material categories, and three-component blends of PP, HMS-PP, and rheology modifier resins with various compositions were conducted. This work has suggested that the rheological behavior of the three-component blend of conventional linear polypropylene, HMS-PP, and rheology modifier resins are similar to that of the HMS-PP alone.

Nucleating Agent

A nucleating agent, sometimes also called a cell size control agent, may be any conventional or useful nucleating agent(s). The amount of nucleating agent to be added depends upon the desired cell size, the selected blowing agent, and the target density of the foam sheet. The nucleating agent is generally added in amounts from about 0.02 to about 2.0 weight percent of the polymeric composition. Some contemplated nucleating agents include inorganic materials (in small particulate form), such as clay (kaloin), talc, silica, and diatomaceous earth. Other contemplated nucleating agents include organic nucleating agents that decompose or react at the heating temperature within the extruder to evolve gas, such as carbon dioxide and/or nitrogen.

One example of an organic nucleating agent is a combination of an alkali metal salt of a polycarboxylic acid with a carbonate or bicarbonate. Some examples of an alkali metal salt of a polycarboxylic acid include, but are not limited to, the monosodium salt of 2,3-dihydroxybutanedioic acid (commonly referred to as sodium to hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate) or polycarboxylic acid such as 2-hydroxy-1,2,3-propanetricarboxylic acid. Some examples of a carbonate or a bicarbonate include, but are not limited to, sodium carbonate, sodium bicarbonate, potassium bicarbonate, potassium carbonate and calcium carbonate.

One contemplated combination is a monoalkali metal salt of a polycarboxylic acid, such as monosodium citrate or monosodium tartrate, with a carbonate or bicarbonate. It is contemplated that mixtures of different nucleating agents may be added in the present invention. Preferred nucleating agents include talc, crystalline silica, and a stoichiometric mixture of citric acid and sodium bicarbonate (the stoichiometric mixture having a 1 to 100 percent concentration where the carrier is a suitable polymer such as low molecular weight polyethylene wax). Talc is preferably added in a carrier, but may also be added in a powder form. The most preferred nucleating agent is talc at about 18 to about 22 weight percent loading in a polyolefin carrier which is added to produce a talc concentration in the foam from about 0.02 to about 1.0 weight percent.

Stability Control Agent

The polymeric foam of the present invention is made with a stability control agent. Stability control agent is a term used by prior art synonymously with the term "aging modifier". As used herein, the term stability control agent refers to chemical species that are added to increase the dimensional stability of the foam substrate after the polymeric foam composition emerges from the die during the foam extrusion process.

Some examples of stability control agents include, but are not limited to, a partial ester of a long chain fatty acid and a polyol, such as glycerol monostearate; certain borate or phosphinate glycol ester compounds such as tri(1-stearylglycero)borate, tri(monostearylpolyoxyethyleneglycol). borate, di(1-stearylglycero) phosphinate; saturated higher fatty acid amides; saturated higher aliphatic amines and complete esters of saturated higher fatty acids, such as stearamide; N-higher aliphatic hydrocarbyl substituted amide of a $C_1$ to $C_8$ aliphatic carboxylic acid such as N-stearyl acetamide or N-stearyl caprylamide; certain higher aliphatic hydrocarbyl ether, ester or anhydride compounds such as behenic anhydride, distearyl ether, distearyl thioether, stearyl laurate and stearyl thiolaurate; certain naphthyl amine compounds such as N,N'-di-beta-naphthyl-paraphenylenediamine or N,N'-di-beta-naphthyl-paradiphenylenediamine, and glycerol monoester of a $C_{20}$–$C_{24}$ fatty acid. The preferred stability control agent is stearamide. It is contemplated that mixtures of stability control agents may be used in the present invention.

Blowing Agents

It is contemplated that various blowing agents may be used in the present invention, including physical blowing agents such as hydrocarbons. The preferred physical blowing agents for this invention are organic chemical compounds that have boiling points less than about 37° C. These organic compounds include, but are not limited to, fully hydrogenated hydrocarbons and partially fluorinated hydrocarbons that are considered to be flammable. Flammable as defined herein generally includes those materials having flashpoints less than about 37.8° C.

The preferred fully hydrogenated hydrocarbon blowing agents include the initial members of the alkane series of hydrocarbons that contain up to five carbon atoms and which are not regulated by governmental agencies as being specifically toxic to human or plant life under normal exposure. These fully hydrogenated blowing agents include methane, ethane, propane, n-butane, isobutane, n-pentane, isopentane and blends thereof.

The most preferred fully hydrogenated hydrocarbon blowing agents are $C_2$ to $C_4$ compounds and blends thereof. An example of a preferred blend is a blend of approximately 67 weight percent n-butane and approximately 33 weight percent isobutane, which is commonly referred to in the industry as an A26 butane blend. This blend may be added at a rate of from about 1 to about 20 weight percent of the total extruder flow rate, and preferably added at a rate of from about 3 to about 15 weight percent of the total extruder flow rate.

It is contemplated that auxiliary blowing agents may be used in the present invention in amounts less than about 40 weight percent of the total blowing agent. The preferred auxiliary blowing agent are partially fluorinated hydrocarbon blowing agents that have molecules containing up to three carbon atoms without any other halogen atoms, and those considered flammable. For example, this includes 1,1-difluoroethane (HFC-152a), and 1,1,1-trifluoroethane (HFC-143a), with the most preferred auxiliary blowing agent being HFC-152a. It is also contemplated that 1-1-chlorofluoroethane (HFC-142b) and 1-1-dichloro-2-fluoroethane (HFC-141b) may be added as auxiliary blowing agents for non-regulated insulation applications.

In addition, water may optionally be added at a low concentration level as an auxiliary blowing agent. The water quality should be at least adequate for human consumption. Water containing a high level of dissolved ions may cause excessive nucleation, so therefore deionized water is preferred. The preferred rate for water addition is from about 0.05 to about 0.5 parts water to 100 parts of the polymeric composition (0.05 to 0.5 phr). The most preferred rate of adding water is from about 0.2 to about 0.3 phr Additives Is The term "additives" is customarily used in the art and is used herein to describe chemical species that may optionally be added to the foamable composition in order to alter specific physical or chemical properties of the foamed product. Additives do not adversely influence the foaming process but do change specific physical properties of the foamed product, such as color, or chemical properties of the foamed product, such as fire retardancy. It is contemplated that other additives may be added to the foamable composition, including, but not limited to, antistatics, coloring agents, fire retardants, anti-microbial agents, anti-mold agents, antioxidants and plasticizers.

A Process of the Present Invention

According to one process of the present invention, pellets or flakes of conventional linear polypropylene(s), high melt strength polypropylene(s), and rheology modifier resin(s) are loaded in their solid form into an extrusion hopper. The polymeric composition comprises from about 1 to 25 weight percent of a conventional linear polypropylene, from about 51 to about 85 weight percent high melt strength polypropylene (HIMS-PP), and from about 5 to about 30 of a rheology modifier resin. The polymeric composition, along with about 0.1 to about 2.0 weight percent loading of pellets of 20% talc compounded in polyethylene (the nucleating agent), are fed by gravity into a extruder.

A stability control agent, such as stearamide, is added to the polymeric composition in an amount from about 0.25 to about 1.7 weight percent of the polymeric composition. The stability control agent is generally added in amounts less than traditional LDPE-only foams. The polymeric composition preferably comprises from about 0.35 to 0.80 weight percent of stearamide. The polymeric-talc mixture is conveyed through a feed zone of the extruder and heated at a temperature sufficient to form a polymeric-talc melt.

A physical blowing agent is added at the injection port area of the extruder in an appropriate ratio to the target density. When producing polymeric foams having a density less than about 160 kg/m$^3$, a physical blowing agent, such as a hydrocarbon, is typically added at a rate of from about 2 to about 20 parts by weight to 100 parts of polymeric composition.

The polymeric-talc melt and the selected blowing agent are thoroughly mixed within the extruder in a mixing zone, and subsequently cooled in a cooling zone before the die. The cooled polymeric-blowing agent melt is extruded through a die (a die appropriate to the desired product form) into a lower pressure region, then formed into the desired-shape and thereafter cooled by convection with ambient air. The extruded tube may be slit by, for example, a conventional slitting machine to form a foam sheet. The foam sheet may optionally pass through a heating oven in which heated forced air is blown directly over its surfaces to reduce the residual blowing agent. This process is referred herein as a "conventional foam extrusion process".

The Foamed Product

The polymeric foams produced with the inventive composition generally have a density of from about 10 kg/m³ to about 160 kg/m³. These polymeric foams are contemplated to have tactile and chemical properties that are similar to those found in LDPE foams in the art. The polymeric foams of the present invention are produced with consistently uniform physical properties. The polymeric foams are light in weight and may be used as protective or cushioning packaging for delicate goods such as computers, glassware, televisions, furniture, and any article that needs to be protected from. gouging, surface-scratching or marring. Other contemplated applications for the polymeric foams of the present invention include uses in construction materials such as pipe insulation, wall insulation and floor underlayment, toys, floatation foam (e.g., life jackets) and recreational parts.

The polymeric foams of the present invention preferably have a thin cross-section The term "thin cross-section" as used herein is defined as a dimension in the thickness direction of the foamed structure that is less than about 15 mm. The preferred dimension in the thickness direction of the present invention is from about 0.5 to about 15 mm. It is contemplated, however, that the polymeric foams of the present invention may have thicker cross-sections.

The foams of the present invention are "dimensionally" stable. Dimensional stability as defined herein is when the volume of the foam does not either deviate more than about 15 volume percent (ie., does not either shrink more than about 15 volume percent or expand more than about 15 volume percent) from the volume of the polymeric foam at the time of production. The volume of the polymeric foam at the time of production is measured within about 15 minutes, and preferably within 10 minutes, after the foam exits the die. This measurement is used in determining the "fresh" density of the foam. To have a dimensionally stable product, the foam is typically measured after an aging process (from about 14 to about 30 days) and compared to its fresh volume. It is recognized, however, that in the unlikely event that the foam at a later duration is not within about 15 volume percent of its fresh volume, then it is not a dimensionally stable product. It is preferable that the foam does not deviate more than about 10 volume percent from its "fresh" volume.

The foams of the present invention have a maximum service temperature higher that the boiling point of water. This higher service temperature enables a faster aging process for the foams of the present invention as compared to LDPE-only foams because a higher storage temperature may be used without distorting the foam. In addition, foams of the present invention, because of their stability, generally need a lesser amount of stability control agent than LDPE only foams, resulting in a faster aging process.

The polymeric foams of the present invention are resilient and non-brittle. The term "brittleness" is defined in the art as being the inverse of toughness. Toughness is the ability of a material to resist breakage or fracture in the presence of an external force, such as compression, flexure or tension.

EXAMPLES

Inventive Example 1

Pellets of offgrade Polypropylene resin from Mobil (PP) characterized by $\eta^*$ of $4.67 \times 10^3$ poise and tan $\delta$ of 1.65 at 190 ° C., Basell PF814 high melt strength polypropylene (HMS-PP) characterized by a $\eta^*$ of $3.11 \times 10^4$ poise and tan $\delta$ of 1.15 at 190° C. and a tan $\delta$ vs. $\eta^*$ power-law exponent of −0.3302 for the range of 190° C. to 230° C., and Kuraray America Septon® 4030 (SEPS) are blended together in the ratio of 20:70:10. The three-component polymeric blend is characterized by $\eta^*$ of $4.32 \times 10^4$ poise and tan $\delta$, of 1.23 at a 190° C. and a tan $\delta$ vs. $\eta^*$ power-law exponent of −0.2140 for the range of 190° C. to 230° C. The blend will form a foamable composition that is capable of producing a foam with a density as low as 24 kg/m³ in a conventional foam extrusion process.

Inventive Example 2

The PP/HMS-PP/SEPS resin blend ratio of Example 1 was changed from 20:70:10 to 15:70:15. The three-component polymeric blend is characterized by $\eta^*$ of $4.79 \times 10^4$ poise and tan $\delta$ of 1.21 at a 190° C., and a tan $\delta$ vs. $\eta^*$ power-law exponent of −0.1411 for the range of 190° C. to 230° C. The blend will form a foamable composition that is capable of producing a foam with a density as low as 24 kg/m³ in a conventional foam extrusion process.

Inventive Example 3

The PP/HMS-PP/SEPS resin blend ratio of Example 1 was changed from 20:70:10 to 10:75:15. The three-component polymeric blend is characterized by $\eta^*$ of $4.69 \times 10^4$ poise and tan $\delta$ of 1.19 at a 190° C., and a tan $\delta$ vs. $\eta^*$ power-law exponent of −0.1329 for the range of 190° C. to 230° C. The blend will form a foamable composition that is capable of producing a foam with a density as low as 24 kg/m³ in a conventional foam extrusion process.

Inventive Example 4

The PP/HMS-PP/SEPS resin blend ratio of Example 1 was changed from 20:70:10 to 5:75:20. The three-component polymeric blend is characterized by $\eta^*$ of $5.20 \times 10^4$ poise and tan $\delta$ of 1.17 at a 190 ° C., and a tan $\delta$ vs. $\eta^*$ power-law exponent to of −0.0660 for the range of 190° C. to 230° C. The blend will form a foamable composition that is capable of producing a foam with a density as low as 24 kg/m³ in a conventional foam extrusion process.

Inventive Example 5

The SEPS of Example 4 was changed from Kuraray America Septon® 4030 to Kuraray America Septon® 2007. The three-component polymeric blend is characterized by $\eta^*$ of $5.50 \times 10^4$ poise and tan $\delta$, of 1.11 at a 190° C. and a tan $\delta$ vs. $\eta^*$ power-law exponent of −0.1069 for the range of 190° C. to 230° C. The blend will form a foamable composition that is capable of producing a foam with a density as low as 24 kg/m³ in a conventional foam extrusion process.

Inventive Example 6

The PP/HMS-PP/SEPS resin blend ratio of Example 5 was changed from 5:75:20 to 10:70:20. The three-component polymeric blend is characterized by $\eta^*$ of $5.62 \times 10^4$ poise and tan $\delta$ of 1.14 at a 190° C. and a tan $\delta$ vs. $\eta^*$ power-law exponent of −0.0608 for the range of 190° C. to 230° C. The blend will form a foamable composition that is capable of producing a foam with a density as low as 24 kg/m³ in a conventional foam extrusion process.

Inventive Example 7

The rheology modifier of Example 2 was changed from SEPS to Asahi Tuftec® H-1041, a hydrogenated styrene/butadiene block copolymer (SEBC). The three-component polymeric blend is characterized by η* of 4.74×10⁴ poise and tan δ, of 1.16 at a 190° C. and a tan δ vs. η* power-law exponent of −0.0439 for the range of 190° C. to 230° C. The blend will form a foamable composition that is capable of producing a foam with a density as low as 24 kg/m³ in a conventional foam extrusion process.

Inventive Example 8

Recycled post-consumer polypropylene recovered from Pactiv Microfoam®, characterized by η* of 1.40×10⁵ poise and tan δ of 0.81 at 190° C., is combined with the three polymers of Example 1 in the PP/HMS-PP/SEPS blend ratio of {20:21}:51:8. The four-component polymeric blend is characterized by η* of 5.65×10⁴ poise and tan δ of 1.14 at a 190° C. and a tan δ vs. η* power-law exponent of −0.2919 for the range of 190° C. to 230° C. The blend will form a foamable composition that is capable of producing a foam with a density as low as 24 kg/m³ in a conventional foam extrusion process.

Inventive Example 9

The offgrade polypropylene from Mobil is removed from Example 8 and the blend ratio is adjusted to 12:81:7. The three-component polymeric blend is characterized by η* of 4.46×10⁴ poise and tan δ of 1.09 at a 190° C. and a tan δ vs. η* power-law exponent of −0.2494 for the range of 190° C. to 230° C. The blend will form a foamable composition that is capable of producing a foam with a density as low as 24 kg/m³ in a conventional foam extrusion process.

Comparative Example 10

The PP/HMS-PP/SEPS blend ratio of Example 5 was changed from 5:75:20 to 5:70:25. The three component polymeric blend is characterized by η* of 6.32×10⁴ poise and tan δ of 1.10 at a 190° C., and a tan δ vs. η* power-law exponent of −0.0608 for the range of 190° C. to 230° C. The blend will not produce a foam with a density below 160 kg/m³ in a conventional foam extrusion process.

Comparative Example 11

The PP/HMS-PP/SEPS resin blend ratio of Example 5 was changed from 5:75:20 to 17.5:55:27.5. The three-component polymeric blend is characterized by η* of 7.12×10⁴ poise and tan δ of 1.15 at a 190° C., and a tan δ vs. η* power-law exponent of −0.0587 for the range of 190° C. to 230° C. The blend will not produce a foam with a density below 160 kg/m³ in a conventional foam extrusion process.

Comparative Example 12

The rheology modifier of Example 1 is removed so as to produce a PP/HMS-PP blend with a blend ratio of 22.2:77.8. The two-component polymeric blend is characterized by η* of 3.40×10⁴ poise and tan δ, of 1.23 at a 190° C. and a tan δ vs. η* power-law exponent of −0.3679 for the range of 190° C. to 230° C. The blend will not produce a foam with a density below 160 kg/m³ in a conventional foam extrusion process.

Comparative Example 13

The PP of Example 10 is changed to from Offgrade polypropylene from Mobil to virgin Dow H70-20NA Polypropylene Homopolymer, which characterized by η* of 1.40×10³ poise and tan δ, of 3.80 at 190° C. The two-component polymeric blend is characterized by η* of 3.30'10⁴ poise and tan δ, of 1.20 at a 190° C. and a tan δ vs. η* power-law exponent of −0.3559 for the range of 190° C. to 230° C. The blend will not produce a foam with a density below 160 kg/m³ in a conventional foam extrusion process.

Comparative Example 14

Kuraray America Septon® 4030 (SEPS) is added to the polymer blend of Example 13 to produce a PP/HMS-PP/SEPS blend and the ratio is changed to 25:55:20. The three-component polymeric blend is characterized by a η* of 4.17×10⁴ poise and tan δ, of 1.55 at a 190° C. and a tan δ vs. η* power-law exponent of −0.1139 for the range of 190° C. to 230° C. The blend will not produce a foam with a density below 160 kg/m³ in a conventional foam extrusion process.

TABLE 1

Summary of Inventive Examples
INVENTIVE EXAMPLES

| Example | Polymer Composition: PP/HMS-PP/ Rheology Modifier | PP/ HMS-PP/ Rheology Modifier Ratio | η* (poise) | Tan δ | tan δ vs. η* Power Law Exponent |
|---|---|---|---|---|---|
| 1 | Mobil Offgrade PP/ Basell PF814/ Septon 4030 | 20/70/10 | 4.32 × 10⁴ | 1.23 | −0.2140 |
| 2 | Mobil Offgrade PP/ Basell PF814/ Septon 4030 | 15/70/15 | 4.79 × 10⁴ | 1.21 | −0.1411 |
| 3 | Mobil Offgrade PP/ Basell PF814/ Septon 4030 | 10/75/15 | 4.69 × 10⁴ | 1.19 | −0.1329 |
| 4 | Mobil Offgrade PP/ Basell PF814/ Septon 4030 | 5/75/20 | 5.20 × 10⁴ | 1.17 | −0.0660 |
| 5 | Mobil Offgrade PP/ Basell PF814/ Septon 2007 | 5/75/20 | 5.50 × 10⁴ | 1.11 | −0.1069 |
| 6 | Mobil Offgrade PP/ Basell PF814/ Septon 2007 | 10/70/20 | 5.62 × 10⁴ | 1.14 | −0.1150 |
| 7 | Mobil Offgrade PP/ Basell PF814/ Tuftec H-1041 | 15/70/15 | 4.74 × 10⁴ | 1.16 | −0.0439 |
| 8 | Mobil Offgrade PP/ Recovered Pactiv Microfoam/ Basell PF814/ Septon 4030 | 21/20/51/8 | 5.65 × 10⁴ | 1.14 | −0.2919 |
| 9 | Recovered Pactiv Microfoam/ Basell PF814/ Septon 4030 | 12/81/7 | 4.46 × 10⁴ | 1.09 | −0.2494 |

TABLE 2

Summary of Comparative Examples
COMPARATIVE EXAMPLES

| Example | Polymer Composition: PP/HMS-PP/ Rheology Modifier | PP/HMS-PP/ Rheology Modifier Ratio | η* (poise) | Tan δ | tan δ vs. η* Power Law Exponent |
|---|---|---|---|---|---|
| 10 | Mobil Offgrade PP/ Basell PF814/ Septon 2007 | 5/70/25 | $6.32 \times 10^4$ | 1.10 | −0.0608 |
| 11 | Mobil Offgrade PP/ Basell PF814/ Septon 2007 | 17.5/55/27.5 | $7.12 \times 10^4$ | 1.15 | −0.0587 |
| 12 | Mobil Offgrade PP/ Basell PF814 | 22.2/77.8 | $3.40 \times 10^4$ | 1.23 | −0.3679 |
| 13 | Dow H701-20NA/ Basell PF814 | 17/83 | $2.71 \times 10^4$ | 1.39 | −0.3586 |
| 14 | Dow H701-20NA/ Basell PF814/ Septon 4030 | 25/55/20 | $4.17 \times 10^4$ | 1.55 | −0.1139 |

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A process for preparing a polymeric foam, the process comprising:
   (a) melting a conventional linear polypropylene, a high melt strength polypropylene and a rheology modifier resin to form a polymeric composition, the polymeric composition comprising from about 1 to 25 weight percent of conventional linear polypropylene, from about 51 to about 85 weight percent of high melt strength polypropylene and from about 5 to about 30 weight percent of the rheology modifier resin, the composition being Dynamic Mechanical Spectroscopy using a frequency of 1.00 radians/sec and 25 mm diameter parallel plates with a 1.00 mm gap to have complex viscosity (η*) in the range of $1.6 \times 10^4$ to $6.0 \times 10^4$ poise, tan δ in the range of 0.7 to 1.8, and a power-law relation between tan δ and η* where the exponent is within the range between −0.35 and −0.01
   (b) adding a stability control agent to the polymeric composition;
   (c) dissolving an effective amount of blowing agent;
   (d) transferring the mixture of step (c) to an expansion zone; and
   (e) permitting the mixture of step (d) to expand in the expansion zone to produce the polymeric foam.

2. The process of claim 1, further including the step of adding a nucleating agent before step (d).

3. The process of claim 2, wherein the nucleating agent is selected from the group consisting of talc, crystalline silica, and a mixture of citric acid and sodium bicarbonate.

4. The process of claim 3, wherein the nucleating agent is talc.

5. The process of claim 1, wherein the blowing agent is chosen from the group consisting of methane, ethane, propane, n-butane, isobutane, n-pentane, and blends thereof.

6. The process of claim 5, wherein the blowing agent is chosen from the group of n-butane, isobutane and a blend thereof.

7. The process of claim 1, wherein the stability control agent is chosen from the group of stearamide, erucamide, and a blend thereof.

8. A polymeric foam formed by the process of claim 1.

9. The process of claim 1, wherein the conventional linear polypropylene is from about 10 to about 15 weight percent.

10. The process of claim 1, wherein the high melt strength polypropylene is from about 55 to about 65 weight percent.

11. The process of claim 1, wherein the rheology modifier resin is from about 10 to about 20 weight percent.

12. The process of claim 1, wherein the conventional linear polypropylene is from about 10 to about 15 weight percent, the high melt strength polypropylene is from about 55 to about 65 weight percent and the rheology modifier resin is from about 10 to about 20 weight percent.

13. The process of claim 10, wherein the conventional linear polypropylene is selected from the group consisting of post-industrial recycled polypropylene, post-consumer recycled polypropylene, offgrade virgin polypropylene, and blends thereof.

14. The process of claim 1, wherein the rheology modifier resin is selected from the group consisting of hydrogenated styrene-isoprene-styrene block copolymer (SEPS), styrene-butadiene random copolymer, hydrogenated styrene-butadiene random copolymer, styrene-isoprene random copolymer, hydrogenated styrene-isoprene random copolymer, styrene-butadiene block copolymer (SBR), hydrogenated styrene-butadiene block copolymer (SEB, SEBC), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), styrene-ethylene copolymer, styrene-propylene copolymer, ethylene-styrene graft copolymer, propylene-styrene graft copolymer, EPM-styrene graft copolymer, EPDM-styrene graft copolymer, and combinations thereof.

15. The process of claim 14, wherein the rheology modifier resin is a hydrogenated styrene-isoprene-styrene block copolymer (SEPS).

16. The process of claim 1, further including the step of adding at least one additive before step (d).

17. The process of claim 16, wherein at least one additive is selected from the group consisting of antistatics, coloring agents, fire retardants, anti-microbial agents, anti-mold agents, antioxidants, and plasticizers.

* * * * *